(No Model.)
2 Sheets—Sheet 2.
A. S. FOLGER.
EVAPORATOR.
No. 306,821.  Patented Oct. 21, 1884.
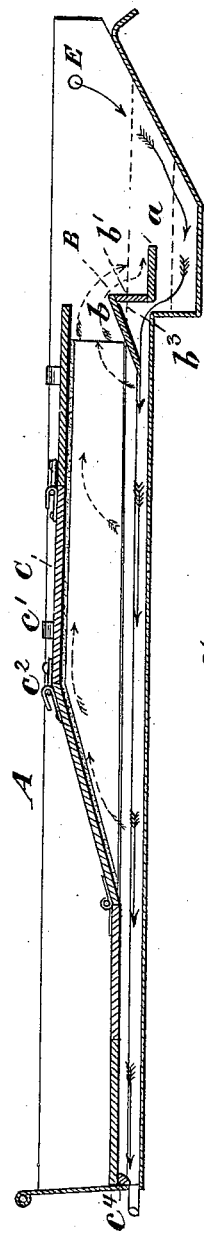
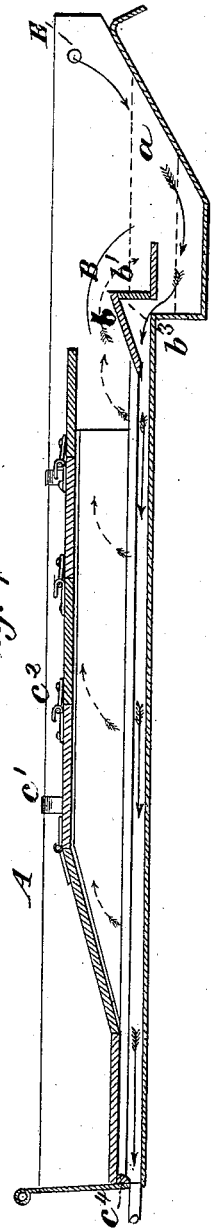
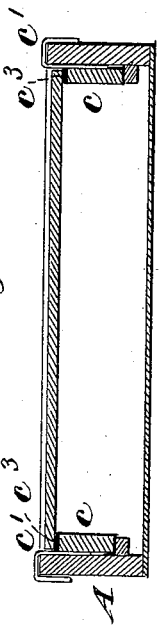
Witnesses.
A. Ruppert.
Alfred T. Gage
Inventor:
A. Smith Folger,
by
England & Blanchard
Atty's

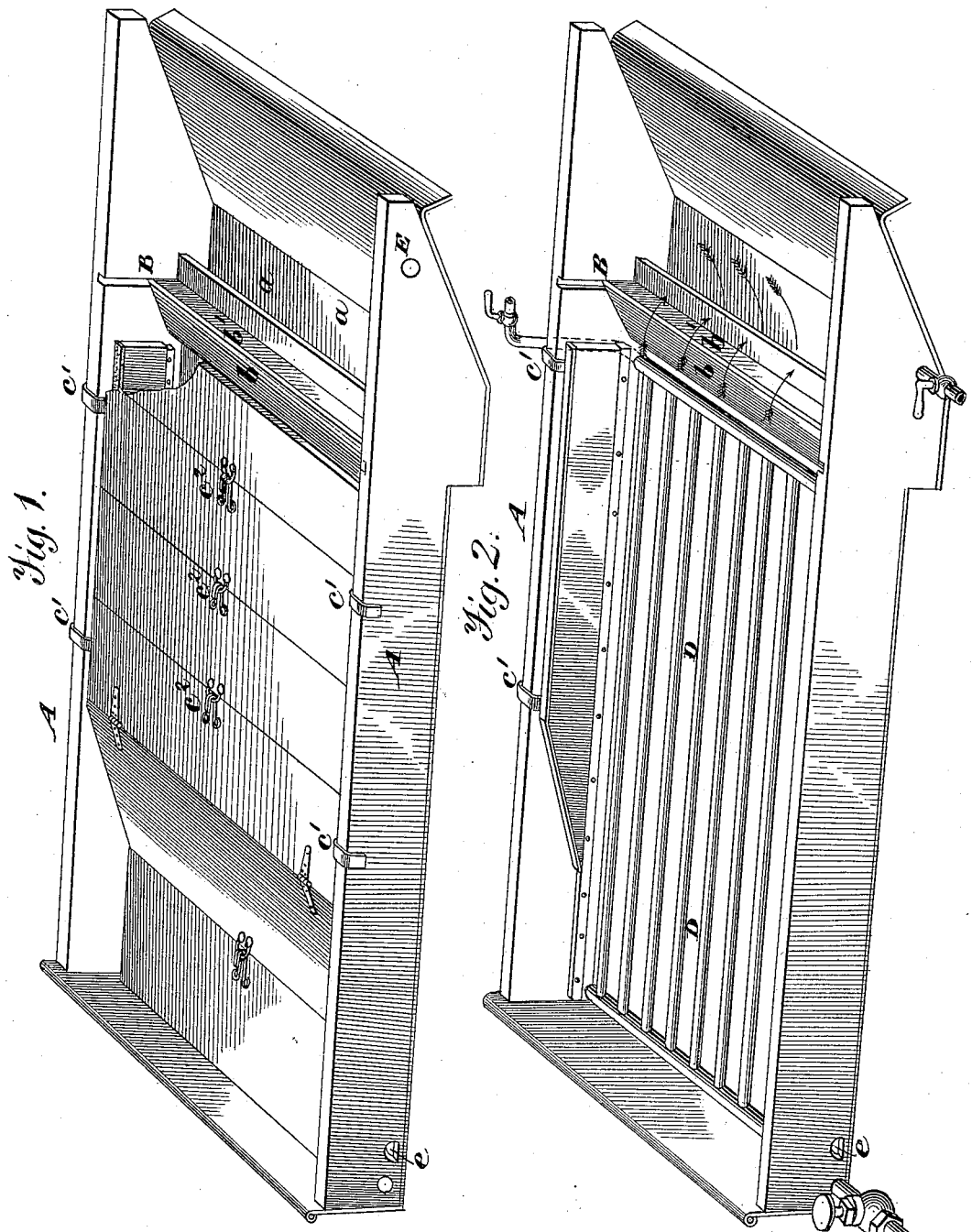

UNITED STATES PATENT OFFICE.

A. SMITH FOLGER, OF WASHINGTON, IOWA.

EVAPORATOR.

SPECIFICATION forming part of Letters Patent No. 306,821, dated October 21, 1884.

Application filed February 23, 1884. (No model.)

*To all whom it may concern:*

Be it known that I, A. SMITH FOLGER, a citizen of the United States, residing at Washington, in the county of Washington and State of Iowa, have invented certain new and useful Improvements in Evaporators, of which the following is a specification, reference being had therein to the accompanying drawings.

This invention relates to certain improvements in that class of evaporators for evaporating saccharine juices in the manufacture of sugar, and it is designed as an improvement upon the Letters Patent No. 242,822, issued to me on the 14th day of June, 1881, in which the scum is automatically separated from the juice by the pressure of the steam generated from the evaporating juice; and it has for its object to provide for more effectually separating the scum and other impurities, such as sediment and the like, as more fully hereinafter described. This I attain by the means illustrated in the accompanying drawings, in which—

Figure 1 represents a perspective view of my improved evaporator entire, except a small portion at one side, which is broken away to show the side supports for the cover; Fig. 2, a perspective view with the cover removed, and Fig. 3 a longitudinal vertical section of my improved evaporator. Fig. 4 represents a similar view of a modification of my invention, and Fig. 5 a transverse vertical section of the evaporator.

The letter A indicates a pan constructed of suitable material, and of any convenient shape and dimensions, which, near the forward end is provided with a depression or well, $a$, for the reception of the scum, as more fully hereinafter set forth.

The letter B indicates a "scum-stop," which consists of a partition of suitable material extending across the pan near the front end of the bottom of the main portion of the pan, the said partition having an inclined wall, $b$, and a vertical wall, $b'$, the partition being so located with respect to the bottom of the main portion of the pan that the horizontal wall will be level with said bottom of the main portion, or slightly below it, and a space or passage, $b^3$, will be formed between the inclined and vertical walls and the bottom leading from the well $a$ to the main portion of the pan, for the purposes presently explained.

C indicates a removable cover or top, which fits within the pan, and is supported therein by means of the longitudinal side supports, $c$, which are adjustably secured to the sides of the pan by means of hangers $c'$, in such manner as to adapt the pan to the reception of a set of interchangeable covers by sliding said supports upon the sides of the pan. The covers are constructed in sections, which are connected by means of elastic hooks and eyes $c^2$. The covers, when in place, are seated upon the elastic rubber packing-strips $c^3$, which prevents the escape of steam at the sides. One or more sections of the cover at the rear are located close to the bottom of the main portion of the evaporator, and are connected by an inclined section to the forward sections of the cover, as shown in Figs. 1, 3, and 4 of the drawings.

As before stated, a series of interchangeable covers may be employed, and these may be arranged as shown, respectively, in Figs. 3 and 4, or in any other convenient manner. The rear end of the rear section, at its lower edge, is provided with a transverse flange, $c^4$, which keeps the steam from escaping at the rear.

The pan is set with the main portion over a furnace; or the said main portion may be heated by a system of steam-pipes, as indicated by the letter D in the drawings. Heat being applied as above mentioned, the juice is admitted at E, and passes into the well $a$, from whence it flows into the main portion of the pan through the passage $b^3$. The scum arising from the hot juice collects above the level of the same, below the cover, which confines the steam and causes it to force the scum over the scum-stop into the well, where the scum collects on the surface of the juice and the gums sink to the bottom. The pure juice that may possibly be carried over the stop returns with the current into the main portion of the pan, and passes off through the passage $e$ to the finishing-pan, which may be of any approved construction. The course of the juice and impurities is plainly shown by the arrows in Figs. 3 and 4 of the drawings.

Having thus described my invention, what

I claim, and desire to secure by Letters Patent, is—

1. The combination, with the main portion of the pan, of the scum-well at the front, sunk below the bottom of the said main portion of the pan, substantially as and for the purpose set forth.

2. The combination, with the pan having a well near its forward end sunk below the bottom of the main body of the pan, of the scum-stop, arranged as described, with its horizontal portion on a level with said bottom and its vertical and inclined portions above the same, whereby the juice is caused to enter the main portion of the pan below the level of the liquid in the said main portion, and the scum returned over said scum-stop and prevented from mixing with the clarified juice, substantially as specified.

3. The combination, with the pan, of the adjustable side supports and interchangeable covers, substantially as and for the purpose specified.

4. In combination with the side supports and covers, the interposed packing, substantially as specified.

5. The combination, with the covers, constructed in sections, of the elastic fastening devices by which they are held together, substantially as and for the purposes specified.

6. The combination, with the pan and the upper sections of the cover, of the rear section, having a downward flange at its rear, and the inclined section, arranged substantially as and for the purposes set forth.

In testimony whereof I affix my signature in presence of two witnesses.

A. SMITH FOLGER.

Witnesses:
J. M. STINSON,
GEORGE S. TRIPP.